United States Patent
Ito et al.

(10) Patent No.: US 6,930,472 B2
(45) Date of Patent: Aug. 16, 2005

(54) SWITCHING REGULATOR CIRCUIT

(75) Inventors: Masayasu Ito, Shizuoka-ken (JP); Hitoshi Takeda, Shizuoka-ken (JP); Kentaro Murakami, Shizuoka-ken (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 110 days.

(21) Appl. No.: 10/682,049

(22) Filed: Oct. 9, 2003

(65) Prior Publication Data

US 2004/0070374 A1 Apr. 15, 2004

(30) Foreign Application Priority Data

Oct. 15, 2002 (JP) ........................................ 2002-300960

(51) Int. Cl.[7] .............................................. G05F 1/12
(52) U.S. Cl. ...................... 323/247; 323/225; 323/290
(58) Field of Search ................................ 323/222, 247, 323/282, 284, 290, 225, 301, 351; 219/502

(56) References Cited

FOREIGN PATENT DOCUMENTS

JP          2001-215913        8/2001    ............ G09G/3/14

OTHER PUBLICATIONS

ESP@CENET Database—12, Patent Number JP2001215913, Published Aug. 10, 2001, 1 page.

Primary Examiner—Jessica Han
(74) Attorney, Agent, or Firm—Osha Liang LLP

(57) ABSTRACT

A switching regulator circuit for supplying two input potentials to a passive device that is driven by a potential difference between the two input potentials irrespective of potential differences between the two input potentials and a ground potential, includes: a low-voltage input terminal for receiving a lower input potential that is lower one of the two input potentials; a coil provided between the low-voltage input terminal and the passive device in series; and a switching device, provided between the low-voltage input terminal and the passive device to be in series with the coil, for making the coil generate a potential higher than the lower input voltage by repeatedly switching whether or not a current is allowed to flow in the coil, so as to supply the generated potential to the passive device.

5 Claims, 2 Drawing Sheets

SWITCHING REGULATOR CIRCUIT

This patent application claims priority from a Japanese patent application No. 2002-300960 filed on Oct. 15, 2002, the contents of which are incorporated herein by reference.

BACKGROUND OF THE INVENTION

1. Field of the Invention

The present invention relates to a switching regulator circuit for controlling power supplied to a load.

2. Description of the Related Art

Conventionally, a switching regulator circuit is provided between a power supply and a load in order to control power supplied to the load. The switching regulator circuit controls a voltage and a current supplied to the load by repeatedly switching whether or not supply of the power to a coil provided in series with the load is allowed as disclosed in Japanese Patent Application Laid-Open No. 2001-215913, pages 6–12 and FIGS. 2–6, for example.

FIG. 1 shows an exemplary conventional switching regulator circuit 300. The switching regulator circuit 300 is provided between a power supply 200 and a load 250. The switching regulator circuit 300 includes a high-voltage input terminal 306, a low-voltage input terminal 308, a high-voltage output terminal 310, a low-voltage output terminal 312, a switching device 302, a regulating diode 314, a smoothening capacitor 316 and a coil 304.

The high-voltage input terminal 306 and the low-voltage input terminal 308 are connected to a high-voltage terminal and a low-voltage terminal of the power supply 200, respectively. The high-voltage output terminal 310 and the low-voltage output terminal 312 are connected to a high-voltage terminal and a low-voltage terminal of the load 250, respectively.

The coil 304 is provided between the high-voltage input terminal 306 and the high-voltage output terminal 310 in series, and the switching device 302 is provided between the coil 304 and the high-voltage input terminal 306 in series. The switching device 302 supplies a voltage lower than a power-supply voltage to the load 250 by repeatedly going on and off. More specifically, when the switching device 302 has been turned on, a current is supplied from the power supply 200 to the coil 304. Then, when the switching device 302 has been turned off, a current is supplied to the coil 304 via the regulating diode 314. In a case where the switching device 302 has been turned off, the current supplied from the power supply 200 to the coil 304 is reduced to zero. Therefore, for compensating this reduction of the current, the coil 304 receives the current supplied to the load 250 via the regulating diode 314. Thus, a linear current is supplied to the load 250.

Conventionally, a field-effect transistor is used as the switching device 302. Since the switching device 302 is provided between the high-voltage input terminal 306 and the high-voltage output terminal 310 as described above, it should be formed by a p-channel fiend effect transistor. In other words, it is difficult to use an n-channel field effect transistor because it required application of a voltage higher than the power-supply voltage to a gate terminal thereof.

The conventional switching regulator circuit 300, however, has a problem that, in a case of using the switching device 302 having a predetermined breakdown voltage and a predetermined on-resistance, a chip area becomes larger. This is because the conventional switching regulator circuit 300 uses the p-channel field effect transistor as the switching device 302. Moreover, the p-channel field effect transistor has low carrier mobility. Therefore, a high-speed operation of the p-channel field effect transistor is difficult.

In addition, there are a few types of p-channel field effect transistor in the marketplace. Therefore, it is difficult to select a p-channel field effect transistor having desired characteristics.

SUMMARY OF THE INVENTION

Therefore, it is an object of the present invention to provide a switching regulator circuit, which is capable of overcoming the above drawbacks accompanying the conventional art. The above and other object scan be achieved by combinations described in the independent claims. The dependent claims define further advantageous and exemplary combinations of the present invention.

According to the first aspect of the present invention, a switching regulator circuit for supplying two input potentials to a passive device that is driven by a potential difference between the two input potentials irrespective of potential differences between the two input potentials and a ground potential, comprises: a low-voltage input terminal operable to receive a lower input potential that is lower one of the two input potentials; a coil provided between the low-voltage input terminal and the passive device in series; and a switching device, provided between the low-voltage input terminal and the passive device to be in series with the coil, operable to make the coil generate a potential higher than the lower input voltage by repeatedly switching whether or not a current is allowed to flow in the coil, to supply the generated potential to the passive device.

The switching device may be an n-channel field effect transistor provided in series with the coil, and the switching regulator circuit may further comprise: a detector operable to detect a supply voltage or a supply current supplied from the switching regulator circuit to the passive device; and a controller operable to control a voltage applied to a gate of the n-channel field effect transistor based on the supply voltage or the supply current detected by the detector, to control a ratio of a period in which the n-channel field effect transistor is on or off.

The passive device may be a light-emitting diode operable to emit light based on the potential difference between the input potentials supplied thereto.

The switching regulator circuit may further comprise a smoothening filter operable to smoothen change of the potential difference between the input potentials supplied to the passive device.

The switching regulator circuit may further comprise: a high-voltage input terminal operable to receive a higher input potential that is higher one of the two input potentials; and a diode, provided between the high-voltage input terminal and the passive device to be in series, operable to supply a forward-direction current from the high-voltage input terminal to the passive device.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 2:
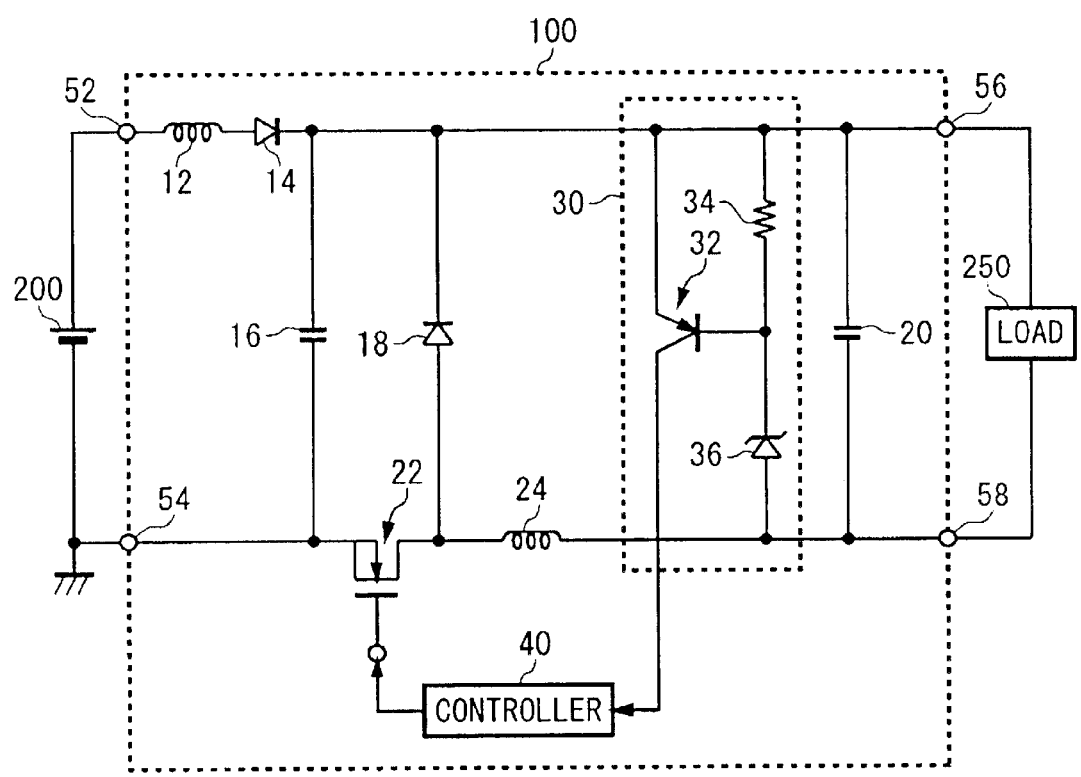
FIG. 2 shows an exemplary structure of a switching regulator circuit 100 according to an embodiment of the present invention.

FIG. 2 shows an exemplary structure of a switching regulator circuit 100 according to an embodiment of the present invention. The switching regulator 100 supplies power to a load 250 in accordance with power supplied from a power supply 200. In this example, the load 250 is a passive device that is driven by a potential difference between two input potentials supplied thereto, irrespective of potential differences between the two input potentials and a ground potential. For example, the load 250 is a light-emitting diode that emits light based on the potential difference between the potentials supplied thereto.

The switching regulator circuit 100 includes a high-voltage input terminal 52, a low-voltage input terminal 54, a high-voltage output terminal 56, a low-voltage output terminal 58, a noise filter 12, a regulating device 14, a smoothening filter 16, a regulating device 18, a smoothening filter 20, a detector 30, a switching device 22, a coil 24 and a controller 40.

The high-voltage input terminal 52 is connected to a high-voltage terminal of the power supply 200 and receives a higher input potential that corresponds to higher one of the two input potentials mentioned above, while the low-voltage input terminal 54 is connected to a low-voltage terminal of the power supply 200 and receives a lower input potential that is lower than the higher input potential and corresponds to lower one of the two input potentials mentioned above.

The noise filter 12 and the regulating device 14 are provided in series between the high-voltage input terminal 52 and the high-voltage output terminal 56 that is connected to a high-voltage terminal of the load 250. The noise filter 12 is a coil, for example, and removes high-frequency noises in the higher input potential transmitted from the high-voltage input terminal 52 to the high-voltage output terminal 56. The regulating device 14 is a diode, for example, and is connected between the high-voltage input terminal 52 and the high-voltage output terminal 56 in series so as to supply a forward-direction current from the high-voltage input terminal 52 to the high-voltage output terminal 56.

The coil 24 is provided between the low-voltage input terminal 54 and the low-voltage output terminal 59 that is connected to a low-voltage terminal of the load 250. The switching device 22 is provided between the low-voltage input terminal 54 and the low-voltage output terminal 58 so as to be in series with the coil 24. The switching device 22 repeatedly switches whether or not a current is allowed to flow in the coil 24, thereby making the coil 24 generate a potential higher than the lower input potential so as to supply the generated potential to the low-voltage terminal of the load 250 via the low-voltage output terminal 58.

The switching device 22 is an n-channel field effect transistor provided in series with the coil 24. That is, a source terminal of the switching device 22 is connected to the low-voltage input terminal 54 while a drain terminal thereof is connected to the low-voltage output terminal 58.

The detector 30 detects a supply voltage or a supply current that is supplied from the switching regulator circuit 100 to the load 250. For example, the detector 30 may detect a potential difference between the high-voltage output terminal 56 and the low-voltage output terminal 58 as the supply voltage.

The controller 40 controls a voltage to be applied to a gate of the switching device 22 based on the supply voltage or current detected by the detector 30, thereby controlling a duration ratio of a period in which the switching device 22 is on or off. In this manner, it is possible to control the supply voltage and the supply current to be supplied to the load 250 to be substantially constant.

According to the switching regulator circuit 100 of this example, the switching device 22 is provided on the lower-voltage side. Thus, an n-channel field effect transistor can be used as the switching device 22. More specifically, since the low-voltage input terminal 54 is grounded, in a case of using the n-channel field effect transistor, the switching operation of the switching device 22 can be done by application of a voltage that is higher than the ground potential by a predetermined threshold voltage to the gate terminal of the switching device. Therefore, it is possible to control the switching device 22 by a voltage lower than the power-supply voltage of the power supply 200.

The switching regulator circuit 100 of this example uses the n-channel field effect transistor as the switching device 22. Thus, the chip area occupied by the switching device 22 can be reduced. Moreover, it is possible to allow a high-speed switching operation of the switching device. Therefore, the switching regulator circuit 100 requires no circuit for increasing the speed of the switching operation. Furthermore, there are a lot of types of n-channel field effect transistor in the marketplace. Therefore, it is possible to select an n-channel field effect transistor having desired characteristics.

The smoothening filter 16 is a filter for removing a noise in the potential input from the high-voltage input terminal 52. For example, the smoothening filter 16 is a capacitor provided between a cathode terminal of the regulating device 14 and the source terminal of the switching device 22 to be in parallel to the power supply 200.

Figure 1:
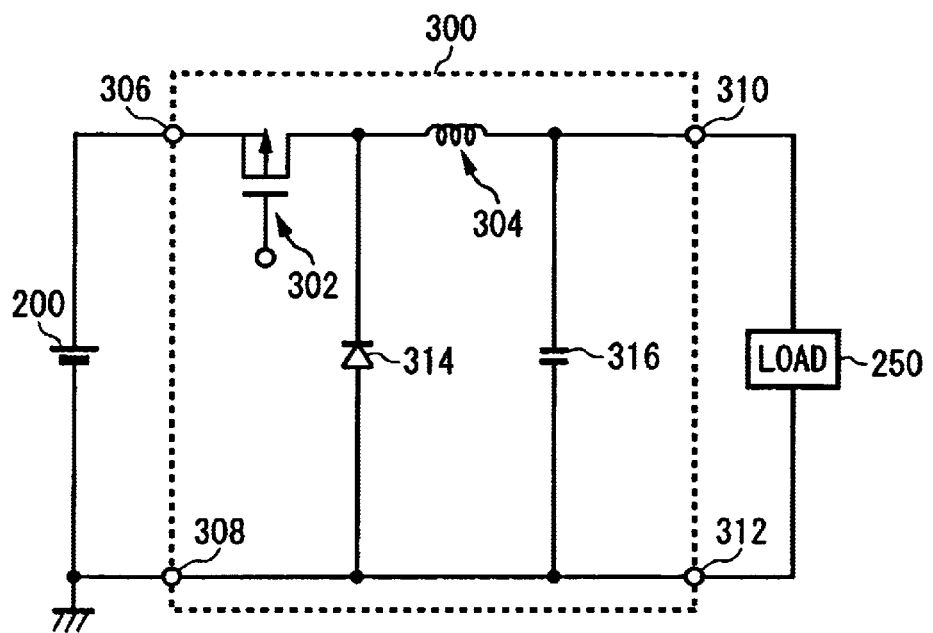
FIG. 1 shows a conventional switching regulator circuit 300.

The regulating device 18 is provided for supplying a current to the coil 24 in a case where the switching device 22 was turned off, like the regulating diode 314 described referring to FIG. 1. That is, the regulating device 18 serves as a path for allowing the current that flowed in the coil 24 while the switching device 22 was on to flow therethrough when the switching device 22 has been turned off. The regulating device 18 is, for example, a diode provided between the cathode terminal of the regulating device 14 and the drain terminal of the switching device 22 to be in parallel to the smoothening filter 16.

The smoothening filter 20 smoothens change of the potential difference between the potentials supplied to the load 250. The smoothening filter 20 is, for example, a capacitor provided between the high-voltage output terminal 56 and the low-voltage output terminal 58 to be parallel to the load 250. This makes it possible to limit rapid change of the potential difference between the potentials supplied to the load 250.

The detector 30 includes a shunt resistor 34, a transistor 32 and a Zener diode 36. The detector 30 of this example detects the potential difference between the potentials supplied to the load 250.

The shunt resistor 34 is connected to the high-voltage output terminal 56 at one end and is connected to a cathode terminal of the Zener diode 36 at the other end. An anode terminal of the Zener diode 36 is connected to the low-voltage output terminal 58. The shunt resistor 34 and the Zener diode 36 are provided in parallel to the load 250. An emitter terminal of the transistor 32 is connected to the high-voltage output terminal 56, while a base terminal thereof is connected to the other end of the shunt resistor 34 and the cathode terminal of the Zener diode 36. Moreover, the transistor 32 supplies a collector current to the controller 40.

In a case where the potential difference between the potentials supplied to the load 250 is smaller than a reverse-direction threshold voltage of the Zener diode 36, the transistor 32 is turned off and no collector current is supplied to the controller 40. In this case, the controller 40 increases an on-duty ratio of the switching device 22 so as to increase the potential difference between the potentials supplied to the load 250.

In a case where the potential difference between the potentials supplied to the load 250 is larger than the reverse-direction threshold voltage of the Zener diode 36, the transistor 32 is turned on. When the difference between the potentials supplied to the load 250 further increases, a voltage dropping in the shunt resistor 34 is increases and therefore the collector current supplied to the controller 40 is also increases. In this case, the controller 40 reduces the on-duty of the switching device 22 so as to make the difference between the potentials supplied to the load 250 smaller. In this manner, it is possible to control the difference between the potentials supplied to the load 250 to be equal to the sum of the reverse-direction threshold voltage of the Zener diode 36 and a base-emitter voltage of the transistor 32.

Although the coil 24 is provided between the low-voltage input terminal 54 and the low-voltage output terminal 58 in this example, the coil 24 may be provided between the high-voltage input terminal 52 and the high-voltage output terminal 56 in series in an alternative example. Also in this structure, it is possible to control the difference between the potentials supplied to the load 250 by controlling the duty ratio of the switching device 22.

As is apparent from the above, according to the present invention, it is possible to provide a switching regulator circuit that can perform a high-speed switching operation on a smaller circuit scale.

Although the present invention has been described by way of exemplary embodiments, it should be understood that those skilled in the art might make many changes and substitutions without departing from the spirit and the scope of the present invention which is defined only by the appended claims.

What is claimed is:

1. A switching regulator circuit for supplying two input potentials to a passive device that is driven by a potential difference between said two input potentials irrespective of potential differences between said two input potentials and a ground potential, comprising:
   a low-voltage input terminal operable to receive a lower input potential that is lower one of said two input potentials;
   a coil provided between said low-voltage input terminal and said passive device in series; and
   a switching device, provided between said low-voltage input terminal and said passive device to be in series with said coil, operable to make said coil generate a potential higher than said lower input voltage by repeatedly switching whether or not a current is allowed to flow in said coil, to supply said generated potential to said passive device.

2. A switching regulator circuit as claimed in claim 1, wherein said switching device is an n-channel field effect transistor provided in series with said coil, and
   said switching regulator circuit further comprises:
   a detector operable to detect a supply voltage or a supply current supplied from said switching regulator circuit to said passive device; and
   a controller operable to control a voltage applied to a gate of said n-channel field effect transistor based on said supply voltage or said supply current detected by said detector, to control a ratio of a period in which said n-channel field effect transistor is on or off.

3. A switching regulator circuit as claimed in claim 1, wherein said passive device is a light-emitting diode operable to emit light based on said potential difference between said input potentials supplied thereto.

4. A switching regulator circuit as claimed in claim 1, further comprising a smoothening filter operable to smoothen change of said potential difference between said input potentials supplied to said passive device.

5. A switching regulator circuit as claimed in claim 1, further comprising:
   a high-voltage input terminal operable to receive a higher input potential that is higher one of said two input potentials; and
   a diode, provided between said high-voltage input terminal and said passive device to be in series, operable to supply a forward-direction current from said high-voltage input terminal to said passive device.

* * * * *